3,337,639
PROCESS FOR THE PREPARATION OF ORGANIC PEROXIDES
Pieter Lucas Stedehouder and Cornelis Ugo Kloosterman, Deventer, Netherlands, assignors to Koninklijke Industrieele Maatschappij vorheen Noury & van der Lande N.V., Deventer, Netherlands, a corporation of the Netherlands
No Drawing. Filed July 14, 1965, Ser. No. 472,037
Claims priority, application Netherlands, Mar. 3, 1959, 236,702
2 Claims. (Cl. 260—610)

This application is a continuation-in-part of application Ser. No. 11,495 filed Feb. 29, 1960, now abandoned.

This invention relates to a process for the preparation of organic peroxides. More particularly, the process of this invention is directed to the preparation of organic peroxides by reaction of a compound containing one or more hydroperoxy groups with a compound containing one or more alcoholic hydroxyl groups.

British patent specification No. 792,558 describes a process for the preparation of organic peroxides, in which an alcohol and a hydroperoxide, in the presence of a catalyst, are allowed to react with each other in a solution of an aliphatic carboxylic acid in which both the reacting components and the water liberated during the reaction are soluble. After having finished the reaction, the catalyst is neutralized whereafter the reaction mixture is distilled in vacuo so as to recover the aliphatic carboxylic acid. Finally, the peroxide is isolated from the distillation residue.

This well-known process has the drawback that the starting material and also the solvent have to be almost anhydrous i.e., for repeated use the acid recovered has to be made anhydrous. This is attended with special expenses and it makes the process complicated. Furthermore, in order to avoid decomposition of the peroxides special care must be taken in the recovery of the aliphatic carboxylic acid solvent, e.g., acetic acid. Therefore, expensive apparatus such as a film-evaporator is required. Moreover, the aliphatic acids used are corrosive and possess a disagreeable odor. In addition acetic acid, the preferred solvent, can only be handled with difficulty at low outside temperatures.

The object of the present invention is to avoid the difficulties and complexities of prior art methods in the production of organic peroxides.

A further object of this invention is to provide a process for the production of organic peroxides which is simple, efficient and gives high yields.

A further object of this invention is to provide a process for the production of organic peroxides by the reaction of a compound containing one or more hydroperoxy groups with a compound containing one or more alcoholic hydroxy groups.

The present invention in its preferred form presents a process for the preparation of organic peroxides comprising reacting a compound selected from the class consisting of organic monohydroperoxides and organic polyhydroperoxides with a compound selected from the class consisting of monohydric alcohols and polyhydric alcohols in a molar ratio of about 1:1–1.5 in the presence of a strong acid catalyst as being the only acid in the reaction mixture and removing water from the acid reaction mixture during the reaction by distillation.

By the process of this invention excellent and often quantitative yields of technically pure peroxides may be obtained in a simple and efficient manner, even when commencing with moist and possibly volatile technical starting materials. These superior results as compared to the known process disclosed by the above-discussed British Patent 792,558 are particularly surprising, since that process when conducted while eliminating water from the reaction mixture during the reaction by distillation results in a failure to obtain any of the desired product. In other words, it is essential to the present process that the strong acid catalyst be the only acid in the reaction mixture and that the reaction mixture be free of carboxylic acids such as disclosed by the British patent.

The hydroperoxide starting materials which may be employed in this invention include saturated aliphatic hydroperoxides, especially tertiary hydroperoxides, such as tertiary butyl-hydroperoxide, tertiary amylhydroperoxide; cycloalkylhydroperoxides, such as decalinehydroperoxide, para-methanehydroperoxide; cycloalkylarylhydroperoxides, such as tetralinehydroperoxide; aralkylhydroperoxides, such as cumylhydroperoxide, diisopropylbenzenemonohydroperoxide, diisopropylbenzenedihydroperoxide and para-cumenehydroperoxide.

Among the alcoholic starting materials which may be used are aliphatic monohydric and polyhydric alcohols, such as 3,5,5-trimethylhexanol-1, triethyleneglycol; aralkyl alcohols, such as 2-phenylpropanol-2, 2-(p-isopropylphenyl) propanol-2, 2-(p-methylphenyl) propanol-2, benzhydrol and triphenylcarbinol.

It is clear, that in the case of two or more OH-groups it is not necessary for all groups to be converted.

The reaction is preferably carried out at a temperature of about 20–80° C., especially at about 40° C.

According to the invention, during the reaction, water, by which in this connection is meant the water possibly present in the starting material as well as the water formed during the conversion, can be eliminated from the mixture by carrying out the reaction under reduced pressure, so that water distills off.

However, it is also possible to eliminate water with the aid of an entrainer, i.e., a volatile inert organic liquid which is added to the reaction mixture in such a quantity that during the reaction, water and a part of the volatile organic liquid can be distilled off at reduced pressure. Of course, distillation in the presence of an entrainer can also be conducted under atmospheric pressure when desired. The quantities of organic liquid added are never so large that therein the water formed can fully dissolve.

Where it is wished to reduce the dangerousness of the final product, a non-volatile solvent may also be added at the start of the reaction, which solvent will appear in the reacted mixture.

In case that one of the starting products is volatile and distills over with the water, it is necessary to have this organic phase passed back into the reaction mixture after separating out the water, which in the best possible way may be effected continuously.

As a volatile organic entraining liquid there may preferably be employed aromatic and aliphatic hydrocarbons such as xylene, cumene, pentane, "Shell" Petroleum Spirit (having a boiling range of 100–140° C.) and "V(arnish) M(akers) and P(aint)" naphtha (boiling range of 95–160° C.). Mixtures of the above volatile liquids may also be used.

In some cases it is unnecessary to add a volatile organic liquid to the reaction mixture since such liquid is already present in the technical grade reactants generally available. Thus, if tertiary butylhydroperoxide is one of the reacting components, ditertiary butylperoxide may also be applied with advantage as a volatile organic liquid, because this substance is already present in a proportion of about 20% in the technical tertiary butylhydroperoxide. In case that compounds of the general formula

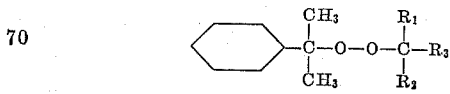

in which $R_1$, $R_2$ and $R_3$ represent hydrogen and/or organic groups, are being prepared, cumene is already present in the technical starting material.

The organic liquids especially mentioned above are non-corrosive, easily obtained and handled and they can be eliminated from the reaction mixture in a simple way.

The process according to the invention is excellently suitable for the preparation of dicumylperoxide from technical cumylhydroperoxide and technical 2-phenyl-propanol-2.

Small quantities of strong acids, especially sulphuric acid, methionic acid and toluenesulphonic acid may be used as a catalyst. The catalyst may be added continuously or by small amounts, as desired.

In order that the invention may be readily understood, the following specific examples are set forth. Where in these examples active O-content is mentioned, this has been measured iodometrically.

EXAMPLE I

*Preparation of dicumylperoxide*

(A) 76 g. of pure cumylhydroperoxide (½ mole) was mixed with 81.6 g. of pure 2-phenylpropanol-2 (½ mole). Hereafter 185 mg. of diluted $H_2SO_4$ (1 vol. conc. $H_2SO_4$:1 vol. $H_2O$) was added to the mixture drop by drop. The reaction mixture was heated with stirring at at a pressure of 15 mm. and a temperature of 40° C. during 15 minutes. Thereafter 185 mg. of diluted $H_2SO_4$ was added once more and after stirring during one hour and 15 minutes another quantity of 185 mg. of diluted $H_2SO_4$ was added. Heating at 40° C. in vacuo was continued during 2 hours. During the reaction, water distilled off.

So as to isolate the dicumylperoxide obtained from the reaction mixture, it was dissolved in 125 ml. of benzene, washed with an excess of diluted $NaHCO_3$-solution and thereafter washed free from alkali with water. After removing the water, the benzene was distilled off at a pressure of 15 mm. till a bottom temperature of 95° C. and at a pressure of 1 mm. the starting material which has not come into reaction, till a bottom temperature of 98° C.

120 g. of crude dicumylperoxide with a melting point of 37–38° C. was obtained.

(B) 108.5 g. of 70% technical cumylhydroperoxide (½ mole) was mixed with 116 g. of 70% technical and still moist 2-phenylpropanol-2 (0.6 mole prepared in the well-known way from technical cumylhydroperoxide with sodium sulphite). Hereafter 185 mg. of diluted $H_2SO_4$ was added to the mixture drop by drop. The reaction mixture was heated during 15 minutes with stirring at a pressure of 15 mm. and a temperature of 40° C. Subsequently, 185 mg. of diluted $H_2SO_4$ was added once more and after one hour and 15 minutes another quantity of 185 mg. of diluted $H_2SO_4$ was added. Hereafter stirring of the reaction mixture was continued during 3 hours under the same circumstances. During the reaction, water and a small quantity of cumene which was present in the starting material as impurity distilled over.

So as to isolate the dicumylperoxide obtained from the reaction mixture it was washed with an excess of diluted $NaHCO_3$-solution after cooling to room temperature and thereafter washed free from alkali with water at 50° C. After removing the water, the volatile impurities were distilled off at a pressure of 15 mm. and subsequently at a pressure of 1 mm. till a bottom-temperature of 95° C.

128.8 g. of crude dicumylperoxide with a melting point of 37–38° C. was obtained. After recrystallisation from methanol, the melting point was 40–41° C.

*Analysis.*—Theoretical: C, 80.00%; H, 8.15%; O, 11.85%. Found: C, 79.99%; H, 8.11%; O, 12.14%.

(C) 108.5 g. of 70% technical cumylhydroperoxide (½ mole) was mixed with 81.6 g. of pure 2-phenylpropanol-2 (0.6 mole) and 176.5 ml. of xylene. Hereafter 93 mg. of a 50% solution of methionic acid in water was added to the mixture, and subsequently the mixture was heated during 30 minutes with stirring at a pressure of 15 mm. and a temperature of 40° C. Then another quantity of 93 mg. of diluted methionic acid was added and after stirring during 90 minutes once more 93 mg. of methionic acid solution was added. The reaction was finished by heating the mixture another 3 hours. During the reaction, water and part of the xylene and cumene distilled over.

In order to isolate the dicumylperoxide obtained from the reaction mixture, it was washed with an excess of diluted $NaHCO_3$-solution after cooling to room temperature and thereafter washed free from alkali with water at 50° C. After removing the water, the remainder of the xylene and the cumene was distilled off at a pressure of 15 mm. till a bottom temperature of 95° C. and subsequently the remaining volatile impurities were eliminated at a pressure of 1 mm. till a bottom temperature of 98° C.

119 g. of crude dicumylperoxide with a melting point of 37–38° C. was obtained.

(D) 108.5 g. of 70% technical cumylhydroperoxide (½ mole) was mixed with 81.6 g. of pure 2-phenylpropanol-2 (0.6 mole) and 176.5 ml. of "Shell" Petroleum Spirit. Hereafter 185 mg. of diluted $H_2SO_4$ was added to the mixture drop by drop. The reaction mixture was heated with stirring at a pressure of 30–40 mm. during 15 minutes at 40° C. Subsequently once more 185 mg. of diluted $H_2SO_4$ was added and after 1 hour and 15 minutes' stirring another quantity of 185 mg. diluted $H_2SO_4$ was added. Hereafter heating of the reaction mixture was continued during another 3 hours under the same circumstances. During the reaction, water and a part of the "Shell" Petroleum Spirit distilled over.

In order to isolate the dicumylperoxide obtained from the reaction mixture, it was washed with an excess of diluted $NaHCO_3$-solution after cooling to room temperature and thereafter washed free from alkali with water at 50° C. After removing the water the remainder of the "Shell" Petroleum Spirit was distilled off at a pressure of 15 mm. till a bottom temperature of 95° C. and subsequently the volatile impurities were eliminated at a pressure of 1 mm. till a bottom temperature of 98° C.

128.5 g. of crude dicumylperoxide with a melting point of 37–38° C. was obtained.

EXAMPLE II

*Preparation of cumyl-diphenylmethyl-peroxide*

21.7 g. of 70% technical cumylhydroperoxide (0.1 mole) was mixed with 18.4 g. of benzhydrol (0.1 mol) and 35 ml. of xylene. Hereafter 37 mg. of diluted $H_2SO_4$ (1 vol. $H_2SO_4$ on 1 vol. $H_2O$) were added to the mixture. The reaction mixture was heated during 15 minutes with stirring at a pressure of 15 mm. and a temperature of 40° C. Subsequently once more 37 mg. of diluted $H_2SO_4$ were added and after stirring during 75 minutes another quantity of 37 mg. of diluted $H_2SO_4$ was added. Hereafter heating of the reaction mixture was continued another 2 hours at a pressure of 15 mm. and a temperature of 40° C. During the reaction, water and a part of the xylene and the cumene distilled over.

In order to isolate the product obtained from the reaction mixture it was washed twice with 50 ml. af 1 N NaOH after cooling to room temperature and thereafter washed free from alkali with water of 50° C. After removing the water, the remainder of the xylene and the cumene was distilled off at a pressure of 15 mm. till a bottom temperature of 80° C. and subsequently the volatile impurities were eliminated at a pressure of 1 mm. till a bottom temperature of 80° C.

A viscous oil which after dilution with methanol and cooling gave a white, crystalline product with a melting point of 109° C. was obtained.

EXAMPLE III

*Preparation of cumyl-paramethylcyclohexylisopropylperoxide*

34.4 g. of 50% technical p-menthane hydroperoxide (0.1 mole) was mixed with 16.3 g. of 2-phenylpropanol-2 (0.12 mole) and 35 ml. of xylene.

The reaction mixture was heated while stirring with 50 mg. diluted $H_2SO_4$ during 15 minutes at a pressure of 15 mm. and a temperature of 40° C. Hereafter once more 50 mg. of diluted $H_2SO_4$ were added and after stirring during 75 minutes another quantity of 50 mg. of diluted $H_2SO_4$ was added. Subsequently heating of the reaction mixture during another 3 hours at a pressure of 15 mm. and a temperature of 40° C. was continued. During the reaction, water and a part of the xylene and the cumene distilled over.

In order to isolate the product obtained from the reaction mixture, it was worked up in the way as described in Example IB.

A light-coloured oil with an active O-content of 4.0% was obtained.

EXAMPLE IV

*Preparation of cumyl-(1-tetrahydronaphthyl)-peroxide*

16.6 g. of tetralinehydroperoxide (0.1 mole) was mixed with 16.3 g. of 2-phenylpropanol-2 (0.12 mole) and 35 ml. of xylene. Subsequently the hydroperoxide was allowed to react with the alcohol under the same circumstances as to temperature, pressure and quantities of diluted $H_2SO_4$ added as described in Example III, on the understanding that the mixture is stirred during 4 instead of during 3 hours. During the reaction, water and a part of the xylene distilled over.

In order to isolate the product obtained, the reaction mixture was worked up in the same way as described in Example IC.

A very viscous product with an active O-content of 4.5% was obtained.

EXAMPLE V

*Preparation of cumyl-3,5,5-trimethylhexyl-peroxide*

21.7 g. of 70% technical cumylhydroperoxide was mixed with 17.3 g. of 3,5,5-trimethylhexanol-1 and 35 ml. of xylene. Subsequently the hydroperoxide was allowed to react with the alcohol under the same circumstances as to temperature, pressure and quantities of diluted $H_2SO_4$ added as described in Example III, on the understanding that the mixture was stirred during 5 instead of during 2 hours. During the reaction, water and a part of the xylene and the cumene distilled over.

In order to isolate the product obtained from the reaction mixture, it was washed with 1 N NaOH and subsequently washed free from alkali with water after cooling to room temperature. After removing the water, the remainder of the xylene and the cumene distilled off at a pressure of 15 mm. till a bottom temperature of 60° C. and subsequently the volatile impurities were eliminated at a pressure of 1 mm. till a bottom temperature of 60° C.

A light-coloured oil with an active O-content of 5.3% was obtained.

EXAMPLE VI

*Preparation of cumyl-peroxyethylene-ethoxyethoxyperoxycumene*

21.7 g. of 70% technical cumylhydroperoxide (0.1 mole) was mixed with 7.5 g. of triethyleneglycol (0.05 mole) and 35 ml. of xylene. Subsequently the hydroperoxide was allowed to react with the alcohol under the same circumstances as regards temperature, pressure and added quantities of diluted $H_2SO_4$ as described in Example III, on the understanding that the mixture was stirred during 5 instead of during 2 hours. During the reaction, water and a part of the xylene and the cumene distilled over.

In order to isolate the product obtained from the reaction mixture, it was worked up in the same way as described in Example V.

A light-coloured oil with an active O-content of 5.7% was obtained.

EXAMPLE VII

*Preparation of cumyl-tert-butyl-peroxide*

(A) 129 g. of 70% tertiary butylhydroperoxide (1 mole) was mixed with 163.2 g. of pure 2-phenylpropanol-2 (1.2 moles) and 350 ml. of toluene. Hereafter 350 mg. of diluted $H_2SO_4$ was added to the mixture.

The reaction mixture was heated with stirring at a pressure of 55 mm. and a temperature of 40° C. during 15 minutes. Subsequently once more 350 mg. of diluted $H_2SO_4$ were added and after 1 hour another quantity of 350 mg. of diluted $H_2SO_4$ was added. Hereafter the reaction mixture was heated during another 3 hours at a pressure of 55 mm. and a temperature of 40° C. During the reaction, water, ditertiary butylperoxide, tertiary butylhydroperoxide and a part of the toluene distilled over. After separation of the water, the organic phase was brought back into the reaction mixture three times.

In order to isolate the product obtained from the reaction mixture, it was washed after cooling with a $NaHCO_3$-solution and subsequently washed free from alkali with water. After removing the water, the toluene and other impurities were distilled off at a pressure of 15 mm. till a bottom temperature of 50° C. and subsequently the product was distilled over at a pressure of 1 mm. Boiling point 50° C.

189 g. of cumyl-tert.butyl-peroxide was obtained $n_{20}=1.4805$.

(B) 129 g. of 70% tertiary butylhydroperoxide (1 mole) was mixed with 136 g. pure 2-phenylpropanol-2 (1 mole) and 200 ml. of pentane. Hereafter 350 mg. of diluted $H_2SO_4$ was added.

The reaction mixture was heated till boiling with stirring at atmospheric pressure at a bottom temperature of 45–50° C. The apparatus used was provided with a water-separator with which water was separated from the condensed vapors; herewith the organic phase was brought back into the reaction mixture continuously.

After boiling during 15 minutes 350 mg. of diluted sulphuric acid were added once more and after 1 hour another quantity of 350 mg. was added. Hereafter heating of the reaction mixture was continued during another 4 hours, after which no water separated out anymore.

In order to isolate the product obtained the reaction mixture was cooled to room temperature, washed with 1 N NaOH and subsequently washed free from alkali with water. The working-up took place according to the method described in Example VIIA.

181 g. of cumyl-tert.butyl-peroxide, boiling point 50° C./1 mm. was obtained. $n_{20}=1.4795$.

(C) With an analogous experiment, whereby instead of pentane 175 g. of ditertiary butyl-peroxide was applied and it was worked at a pressure of 60–65 mm. and a boiling point of about 45° C., 188 g. of cumyl-tert-butylperoxide was obtained, while also 189 g. of ditertiary butyl-peroxide was recovered.

EXAMPLE VIII

*Preparation of cumyl-p-isopropylphenylisopropylperoxide*

38.8 g. of 50% para-diisopropylbenzenemonohydroperoxide (0.1 mole) was mixed with 23.2 g. of 70% 2-phenylpropanol-2(0.12). Hereafter 35 mg. of diluted $H_2SO_4$ was added to the mixture. The reaction mixture was heated with stirring during 15 minutes at a pressure of 15 mm. and a temperature of 40° C. Subsequently once more 35 mg. of diluted $H_2SO_4$ were added and after 1 hour and 15 minutes another quantity of 35 mg. of diluted $H_2SO_4$ was added. Hereafter the reaction mixture was heated during another 3 hours under the same circumstances. During the reaction water and cumene, coming from the technical 2-phenyl-propanol-2, distilled over.

So as to isolate the product obtained from the reaction mixture, this was worked up in the same way as described in Example II.

A light yellow oil with an active O-content of 5.0% was obtained.

EXAMPLE IX

*Preparation of cumyl-triphenylmethyl-peroxide*

26 g. of triphenylcarbinol (0.1 mole) was mixed with 21.7 g. of 70% cumylhydroperoxide (0.1 mole) and 35 ml. of xylene. Subsequently, the hydroperoxide was allowed to react with the alcohol under the same circumstances as regards temperature, pressure and quantity added of diluted sulphuric acid as described in Example II. During the reaction, water and a part of the xylene and the cumene distilled over. Heating in vacuo was continued at 40° C. for about 5 hours.

So as to isolate the product obtained from the reaction mixture, this was washed with 2 N NaOH after cooling to room temperature and subsequently washed free from alkali with water. After removing the water, the remainder of the xylene and the cumene was distilled off at a pressure of 15 mm. till a bottom temperature of 90° C. and subsequently the volatile impurities were eliminated at a pressure of 1 mm. till a bottom temperature of 90° C.

35 g. of a white, crystalline product which after recrystallisation from methanol had a melting point of 76° C. was obtained.

EXAMPLE X

*Preparation of tert. butyl-triphenylmethylperoxide*

26 g. tert. butylhydroperoxide 70% (0.2 mole), 52 g. of triphenylcarbinol (0.2 mole), 100 ml. of toluene and 74 mg. of diluted $H_2SO_4$ were heated with stirring in vacuo of about 60 mm. at a bottom temperature of about 40° C. The apparatus used was provided with a water separator, with which water was separated from the condensed vapors. Herewith the organic phase was brought back into the reaction mixture continuously.

After 1½ hours, 74 mg. of diluted $H_2SO_4$ was added again and the reaction mixture was heated for a further period of 1½ hours under the same circumstances as regards pressure and temperature.

In order to isolate the product obtained from the reaction mixture this was, after cooling, washed with 2 N NaOH and subsequently washed free from alkali with water. After removing the water, the toluene and the impurities of the tert. butylhydroperoxide were distilled off at a pressure of 15 mm. till a bottom temperature of 90° C. and subsequently the rest of the impurities at a pressure of 1 mm. till a bottom temperature of 90° C.

64 g. of the reaction product was obtained. After recrystallisation from methanol, a white, crystalline product with a melting point of about 72° C. was obtained.

The organic peroxides disclosed herein are well known as oxidizing agents in organic reactions and as crystalysts or initiators in polymerization reactions in the synthetic rubber and plastics industries.

Obviously many modifications and variations of the present invention are possible in the light of the above teachings. It is therefore to be understood that within the scope of the invention and the appended claims, the invention may be practiced otherwise than as specifically described.

What is claimed is:

1. Process for the production of organic peroxides comprising reacting those materials consisting essentially of (a) a hydroperoxide selected from the group consisting of saturated alkyl monohydroperoxides, saturated alkyl polyhydroperoxides, cycloalkyl-mono - hydroperoxides, cycloalkylpolyhydroperoxides, cycloalkylaryl-mono-hydroperoxides, cycloalkylaryl - polyhydroperoxides, arylalkyl-mono-hydroperoxides, and aryl - alkyl - polyhydroperoxides, (b) an alcohol selected from the class consisting of alkyl monohydric alcohols, alkyl polyhydric alcohols, aralkyl-monohydric alcohols and aralkyl-polyhydric alcohols in a molar ratio of 1:1–1.5; and (c) a strong acid cataylst at a temperatureture of about 20°–80° C., and removing water from the reaction mixture during the reaction by distillation.

2. Process for the production of organic peroxides comprising reacting those materials consisting essentially of (a) a hydroperoxide selected from the group consisting of saturated alkyl monohydroperoxides, saturated alkyl polyhydroperoxides, cycloalkyl-mono-hydroperoxides, cycloalkyl - polyhydroperoxides, cycloalkylaryl-monohydroperoxides, cycloalkylarly-polyhydroperoxides, arylalkyl-monohydroperoxides, and aryl-alkyl-polyhydroperoxides, (b) an alcohol selected from the class consisting of alkyl monohydric alcohols, alkyl polyhydric alcocatalyst; and (d) a volatile inert hydrocarbon liquid, at a molar ratio of 1:1–1.5, (c) a strong acid hols, aralkyl-monohydric alcohols and aralkyl-polyhydric a temperature of about 20°–80° C., and removing water from the reaction mixture during the reaction by distillation.

References Cited

UNITED STATES PATENTS 2,271,873  2/1942  Perkins et al. _____ 260—615

FOREIGN PATENTS 792,558  3/1958  Great Britain.

OTHER REFERENCES

Groggins, Unit Processes in Organic Synthesis (1952), pp. 610–611.

Riddick et al., "Organic Solvents" (1955), p. 390.

LEON ZITVER, *Primary Examiner.*

W. B. LONE, *Assistant Examiner.*

UNITED STATES PATENT OFFICE
CERTIFICATE OF CORRECTION

Patent No. 3,337,639                          August 22, 1967

Pieter Lucas Stedehouder et al.

It is hereby certified that error appears in the above numbered patent requiring correction and that the said Letters Patent should read as corrected below.

Column 8, line 24, for "cataylst at a temperatureture" read -- catalyst at a temperature --; line 33, for "cycloalkylarly" read -- cycloalkylaryl --; same column 8, line 37, beginning with "catalyst" strike out all to and including "aralkyl-polyhydric" in line 39, same column 8, and insert instead -- hols, aralkyl-monohydric alcohols and aralkyl-polyhydric alcohols in a molar ratio of 1:1-1.5, (c) a strong acid catalyst; and (d) a volatile inert hydrocarbon liquid, at --.

Signed and sealed this 12th day of November 1968.

(SEAL)
Attest:

Edward M. Fletcher, Jr.                          EDWARD J. BRENNER
Attesting Officer                                  Commissioner of Patents